Feb. 4, 1969
I. D. McEACHERN
3,425,201
STALK PICK-UP APPARATUS
Filed Aug. 18, 1965
Sheet 1 of 2
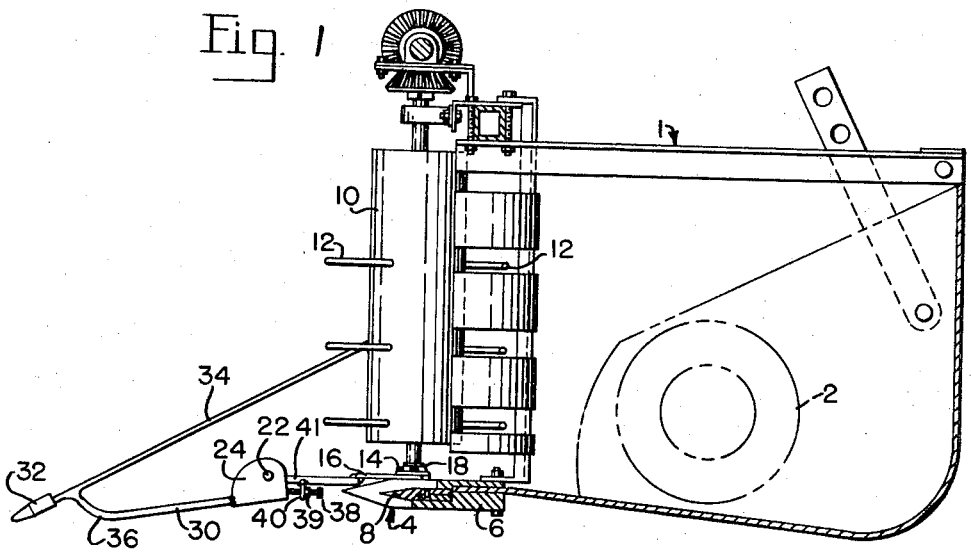
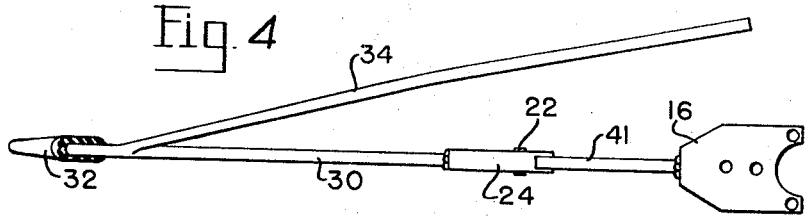
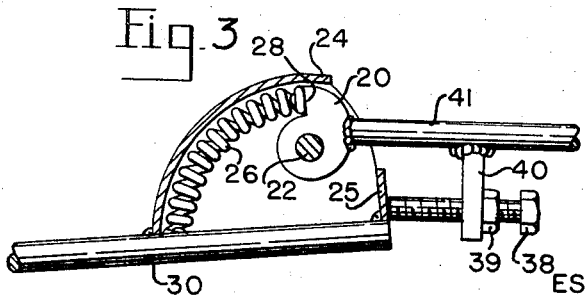
WILLIAM T. McEACHERN
EXECUTOR OF
ESTATE OF IRVIN D. McEACHERN,
DECEASED.
INVENTOR.
BY
*Wayland D. Keith*
HIS AGENT

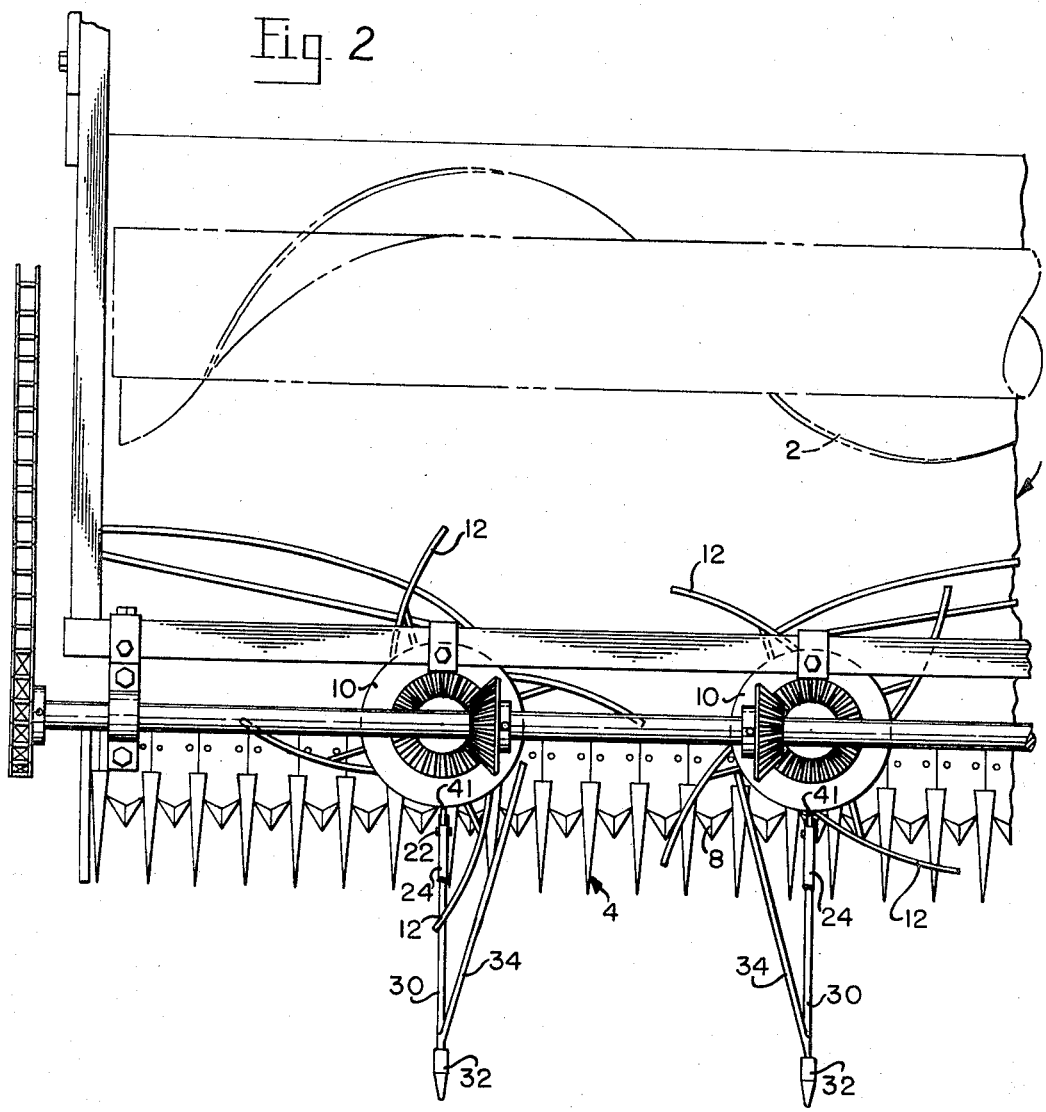

3,425,201
STALK PICK-UP APPARATUS
Irvin D. McEachern, deceased, late of Hale Center, Tex.,
by William T. McEachern, executor, Rte. 2, Hale Center, Tex. 79041
Filed Aug. 18, 1965, Ser. No. 480,824
U.S. Cl. 56—314       4 Claims
Int. Cl. A01d 55/02, 63/00

ABSTRACT OF THE DISCLOSURE

A stalk pick-up which extends forwardly of the sickle of a broadcast type combine and which is adjustably and resiliently supported normally a spaced distance above the terrain, which stalk pick-up has a yieldably rubber like finger on the outer end thereof to enable the stalk pick-up bar to be run close to the terrain without the likelihood of damage to the bar to which it is attached or the sickle with which it is associated.

---

This invention relates to improvements in a stalk pick-up apparatus and more particularly to a stalk pick-up apparatus which may be attached to or made integral with a broadcast type combine, to enable the cutting of a multiplicity of rows of sorgum, maize, legumes, and other such row crops that are normally planted in rows and harvested for the seed thereof.

Various row pick-up devices have been proposed heretofore, but these, for the most part, involved conveyor belts or other moving machine elements to direct the stalks into the gathering device for directing the stalks to be cut into contact relation with the sickle of the combine for cutting action by the sickle.

The present device is so constructed as to permit the picking up of stalks that are lying substantially on the ground and elevating these into a position that will enable the cutting thereof by the sickle of the combine.

The present invention may be attached to a combine which uses a stalk gathering device as set forth in my Patent No. 2,929,185, Gathering Attachment for Combines, issued Mar. 22, 1960, and my Patent No. 2,948,100, for Grain Gathering Attachment for Combines, issued Aug. 9, 1960. The present device is readily attachable to and removable from the combine to enable the combine to be used for broadcast work when not cutting rows or the like, and if desired, the device may be adjusted to skim the top of the ground, or it may be supported a spaced distance thereabove, depending on the type and position of the stalks being cut.

An object of this invention is to provide a stalk pick-up apparatus which may be readily attached to or removed from the combine in a minimum of time.

Another object of the invention is to provide a stalk pick-up apparatus which may be readily adjusted with respect to the terrain to raise the stalks into position to enable the cutting thereof.

Another object of the invention is to provide, on a stalk pick-up device, a resilient finger to enable the stalk pick-up device to be guided in close relation to the ground in such manner that, if the resilient finger engages the ground the resilient member will readily yield.

Still another object of the invention is to provide an adjustable, spring pressed stalk pick-up apparatus which may be readily adjusted to a certain distance above the ground and yet be resiliently mounted so that the finger will spring upward when the runner thereof engages an object, or a raise in the ground.

Still a further object of the invention is to provide a stalk pick-up apparatus for attachment to a broadcast type combine, which apparatus is simple in construction, easy to assemble and to disassemble, and to install on a combine, and which may be readily adjusted or installed with the simplest of tools.

With these objects in mind and others which will become manifest as the description proceeds, reference is to be had to the accompanying drawings, in which like reference characters designate like parts in the several views thereof, in which:

FIG. 1 is a longitudinal sectional view taken through a combine, showing the front portion of the combine, and showing a pick-up apparatus installed thereon;

FIG. 2 is a top plan view of a portion of a combine to show the relation of a pair of the stalk pick-up devices, and showing stalk gathering reels and the sickle on the combine;

FIG. 3 is an enlarged, fragmentary, elevational view of a pivoted joint member, with parts broken away and with parts shown in section, to show the spring and mechanism therein; and FIG. 4 is a top plan view of one of the stalk pick-up devices shown apart from the combine.

With more detailed reference to the drawing, the numeral 1 designates generally a combine having a conveyor 2 therein, and a sickle 4, which is of a character well known in the art of combines. The sickle 4 comprises a stationary member or frame 6 and a movable or reciprocating sickle element 8, as is well known in the art of combines. The combine has stalk gathering cylinders 10 mounted on the stationary sickle frame 6, which cylinders each has stalk gathering fingers 12 mounted thereon and spaced peripherally therearound to gather the stalks and bring these into cutting relation with the sickle 4.

The stationary sickle frame 6 has cylinders 10 mounted thereon and secured thereto by means of bolts or cap screws 14, in the manner set forth in the above mentioned patents. A stalk gathering support plate 16 is interposed between the lower face of a bearing 18 and the upper face of stationary sickle frame 6 in such manner that the bolts pass through the flange of the bearing 18 and through the support plate 16 of the stalk pick-up apparatus. The stalk pickup apparatus has a cylinder like member 20 a spaced distance ahead of sickle frame 6, with a pivot bolt 22 therethrough, which bolt extends through housing 24 to maintain a spring 26 in contact relation with an off-set shoulder 28 on cylinder-like member 20, so as to normally hold the support bar 30 of the stalk pick-up apparatus in a position so that the resilient or rubber-like finger 32 on stalk pick-up diverting bar 34 is held a spaced distance above the ground level. The support bar 30 is curved, as indicated at 36, to form a runner to support the distal end of bar 34 above the ground so as to prevent the engagement of resilient, rubber-like finger 32 into the ground to any material depth, if the device is operated on level terrain. The housing 24 has an abutment 25 thereon to enable bolt 38, which passes through a screw threaded lug 40, to engage the abutment 25 to regulate the height of the distal end of the rubber-like finger above the terrain. The lug 40 is secured to a bar 41, which bar is secured to the support plate 16 as by welding or the like. The finger 32, when adjusted in the proper relation to the terrain on which the device is being operated, a screw threaded nut 39 on bolt 38 is screwed into binding relation with lug 40, to lock the bolt 38 against retrogression.

*Operation*

With the stalk pick-up apparatus extending forward of sickle 6 and with the bars 34 arranged in right and left hand relation, as best seen in FIG. 2, the leaning stalks and the stalks on the ground will be picked up so as to be in upright position, and, as the combine moves forward will cause the stalks to engage with the reciprocating sickle to be cut thereby and to be directed onto the conveyor by rotating cylinders 10 and fingers 12, whereupon, a threshing operation will be performed, in a manner well understood in the art of combines.

Having thus shown and described the invention, what is claimed is:

1. A stalk pick-up attachment for a combine having a plurality of complementary pairs of upright cylinders thereon, which attachment comprises;
  (a) a plurality of complementary pairs of support plates, one positioned intermediate the stationary frame of the combine and each upright cylinder thereof,
    (1) each support plate being secured to the stationary frame of the combine and extending outwardly therefrom,
  (b) a first bar secured to each said support plate and extending outwardly therefrom,
    (1) a pivot member on the distal end of each outwardly extending first bar,
  (c) an outwardly extending support bar pivotally mounted on the outer end of each outwardly extending first bar,
  (d) an axially extending, rubber-like finger on the outer end of each outwardly extending support bar, which rubber-like fingers normally extend downwardly to a point just above the terrain, and are yieldable on contact with the terrain,
  (e) a stalk pick-up bar secured to each support bar near the outer end thereof and extending upwardly and converging inwardly and rearwardly in complementary pairs, and
    (1) each pair of complementary stalk pick-up bars being so positioned as to direct stalks between complementary pairs of upright cylinders of the combine.

2. A stalk pick-up attachment for a combine having a plurality of complementary pairs of upright cylinders thereon, which attachment comprises;
  (a) a plurality of complementary pairs of support plates, one positioned intermediate the stationary frame of the combine and each upright cylinder thereof,
    (1) each support plate being secured to the stationary frame of the combine and extending outwardly therefrom,
  (b) a first bar secured to each said support plate and extending outwardly therefrom,
    (1) a pivot member on the distal end of each outwardly extending first bar,
  (c) an outwardly extending support bar pivotally mounted on the outer end of each outwardly extending first bar,
  (d) an axially extending, rubber-like finger on the outer end of each outwardly extending support bar, which rubber-like fingers normally extend downwardly to a point just above the terrain, and are yieldable on contact with the terrain,
  (e) a stalk pick-up bar secured to each support bar near the outer end thereof and extending upwardly and converging inwardly and rearwardly in complementary pairs,
    (1) each pair of complementary stalk pick-up bars being so positioned as to direct stalks between complementary pairs of upright cylinders of the combine,
  (f) a compression spring biased between each said first bar and the respective support bars to normally urge said support bars downwardly,
    (1) an abutment on each said support bar, and
  (g) screw threaded adjustment means mounted on each said first bar and being engageable with said abutment on said respective support bars to limit the downward movement of said support bars.

3. A stalk pick-up attachment for a combine having a plurality of complementary pairs of upright cylinders thereon, which attachment comprises;
  (a) a plurality of complementary pairs of support plates, one positioned intermediate the stationary frame of the combine and each upright cylinder thereof,
    (1) each support plate being secured to the stationary frame of the combine and extending outwardly therefrom,
  (b) a first bar secured to each said support plate and extending outwardly therefrom,
    (1) a pivot member on the distal end of each outwardly extending first bar,
  (c) an outwardly extending support bar pivotally mounted on the outer end of each outwardly extending first bar,
    (1) an acurate housing secured to the inner end of each outwardly extending support bar and forming a portion of the pivotal mounting thereof,
    (2) each said first bar having an abutment secured to the end thereof, which abutment is associated with the pivotal mount of each said first bar,
    (3) a compression spring confined within each said accurate housing and being biased between an abutment and each said outstanding support bar,
  (d) a rubber-like finger on the outer end of each outwardly extending support bar, which rubber-like finger extends donwwardly to a point just above the terrain,
  (e) a stalk pick-up bar secured to each support bar near the outer end thereof and extending upwardly and converging inwardly and rearwardly in complementary pairs, and
    (1) each pair of complementary stalk pick-up bars being so positioned as to direct stalks between complementary pairs of upright cylinders of the combine.

4. A stalk pick-up attachment for a combine as defined in claim 3; wherein
  (a) each said first bar has a downwardly extending lug thereon on the lower side thereof a spaced distance from the distal end thereof,
    (1) each said lug having a threaded hole formed therein,
  (b) a screw threaded bolt threadably engaging each said hole and extending therethrough and forwardly thereof,
  (c) abutment means secured to the inner end of each said outwardly extending support bar to enable said support bars to be adjusted relative to the terrain.

References Cited

UNITED STATES PATENTS

| 2,839,884 | 6/1958 | Bishop | 56—318 |
| 2,892,298 | 6/1959 | Chaney | 56—314 |
| 2,948,100 | 8/1960 | McGachern | 56—119 |

ABRAHAM G. STONE, *Primary Examiner.*

R. C. HARRINGTON, *Assistant Examiner.*

U.S. Cl. X.R.

56—158, 303